US010852966B1

(12) United States Patent
Liu et al.

(10) Patent No.: US 10,852,966 B1
(45) Date of Patent: Dec. 1, 2020

(54) SYSTEM AND METHOD FOR CREATING MAPPED RAID GROUP DURING EXPANSION OF EXTENT POOL

(71) Applicant: EMC IP Holding Company, LLC, Hopkinton, MA (US)

(72) Inventors: Yousheng Liu, Beijing (CN); Michael P. Wahl, Bulverde, TX (US); Jian Gao, Beijing (CN); Xinlei Xu, Beijing (CN); Lifeng Yang, Beijing (CN); Geng Han, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 52 days.

(21) Appl. No.: 15/787,154

(22) Filed: Oct. 18, 2017

(51) Int. Cl.
  *G06F 12/00* (2006.01)
  *G06F 13/00* (2006.01)
  *G06F 3/06* (2006.01)

(52) U.S. Cl.
  CPC .......... *G06F 3/0631* (2013.01); *G06F 3/0644* (2013.01); *G06F 3/0653* (2013.01); *G06F 3/0689* (2013.01)

(58) Field of Classification Search
  CPC .... G06F 3/0631; G06F 3/0644; G06F 3/0653; G06F 3/0689
  USPC ........................................................ 711/114
  See application file for complete search history.

(56) References Cited

U.S. PATENT DOCUMENTS

| | | | | |
|---|---|---|---|---|
| 5,263,136 A * | 11/1993 | DeAguiar | ........... | G06F 12/0875 345/538 |
| 5,542,065 A * | 7/1996 | Burkes | ................... | G06F 3/0601 711/114 |
| 5,661,617 A * | 8/1997 | Suzuki | ............... | G11B 5/59627 360/77.05 |
| 5,809,516 A * | 9/1998 | Ukai | ...................... | G06F 3/061 711/113 |
| 6,035,306 A * | 3/2000 | Lowenthal | .............. | G06F 11/32 |
| 6,304,941 B1 * | 10/2001 | Lyons | ................... | G06F 3/0607 711/114 |
| 6,405,284 B1 * | 6/2002 | Bridge | .................. | G06F 3/0608 711/114 |
| 6,530,004 B1 * | 3/2003 | King | ................... | G06F 11/1096 711/114 |
| 6,530,035 B1 * | 3/2003 | Bridge | ................ | G06F 11/1076 714/6.12 |
| 6,681,303 B1 * | 1/2004 | Watanabe | ........... | G06F 11/1451 711/162 |
| 7,031,928 B1 * | 4/2006 | Cochran | ................. | G06F 3/061 705/7.11 |
| 7,328,364 B1 * | 2/2008 | Leong | ................. | G06F 11/2087 714/6.22 |
| 7,386,666 B1 * | 6/2008 | Beauchamp | ........ | G06F 11/2094 711/114 |

(Continued)

*Primary Examiner* — Sheng Jen Tsai
(74) *Attorney, Agent, or Firm* — Brian J. Colandreo; Mark H. Whittenberger; Holland & Knight LLP

(57) ABSTRACT

A method, computer program product, and computer system for receiving, by a computing device, one or more drives added to an extent pool of storage devices. An empty Mapped RAID group may be generated. A plurality of extents in the extent pool may be shuffled. A RAID extent may be mapped to the empty Mapped RAID group, wherein the RAID extent is mapped to the empty Mapped RAID group while shuffling the plurality of extents in the extent pool.

9 Claims, 14 Drawing Sheets

(56) References Cited

U.S. PATENT DOCUMENTS

| | | | | |
|---|---|---|---|---|
| 7,409,522 B1* | 8/2008 | Fair | G06F 3/061 | 711/170 |
| 7,660,966 B2* | 2/2010 | Strange | G06F 3/0607 | 711/114 |
| 7,734,888 B1* | 6/2010 | Hamilton | G06F 3/0605 | 711/114 |
| 8,156,306 B1* | 4/2012 | Raizen | G06F 3/0608 | 707/813 |
| 8,429,514 B1* | 4/2013 | Goel | G06F 12/00 | 714/758 |
| 8,706,960 B1* | 4/2014 | Ives | G06F 3/0617 | 711/114 |
| 8,880,788 B1* | 11/2014 | Sundaram | G06F 3/0688 | 711/103 |
| 8,953,265 B1* | 2/2015 | Ma | G11B 27/36 | 360/31 |
| 9,256,381 B1* | 2/2016 | Fultz | G06F 16/185 | |
| 9,323,658 B2* | 4/2016 | Weber | G06F 3/0607 | |
| 9,329,926 B1* | 5/2016 | Clinton | G06F 11/10 | |
| 9,641,615 B1* | 5/2017 | Robins | H04L 67/1097 | |
| 9,710,383 B1* | 7/2017 | Xu | G06F 12/0246 | |
| 9,720,596 B1* | 8/2017 | Bono | G06F 3/0608 | |
| 9,921,912 B1* | 3/2018 | Vankamamidi | G06F 11/1092 | |
| 10,025,523 B1* | 7/2018 | Dagan | G06F 11/2058 | |
| 10,089,026 B1* | 10/2018 | Puhov | G06F 3/0619 | |
| 10,140,041 B1* | 11/2018 | Dong | G06F 3/0619 | |
| 2002/0035668 A1* | 3/2002 | Nakano | G06F 3/064 | 711/114 |
| 2005/0050240 A1* | 3/2005 | Wilkins | G06F 3/0653 | 710/15 |
| 2005/0102551 A1* | 5/2005 | Watanabe | G06F 3/0607 | 714/6.2 |
| 2005/0193231 A1* | 9/2005 | Scheuren | H04L 67/1097 | 714/5.1 |
| 2005/0198453 A1* | 9/2005 | Osaki | G06F 3/0689 | 711/162 |
| 2006/0059301 A1* | 3/2006 | Sugino | G06F 3/0689 | 711/113 |
| 2006/0212747 A1* | 9/2006 | Okamoto | G06F 11/1092 | 714/6.12 |
| 2007/0248017 A1* | 10/2007 | Hinata | G06F 3/067 | 370/238 |
| 2008/0126813 A1* | 5/2008 | Kawakami | G06F 21/72 | 713/193 |
| 2008/0162810 A1* | 7/2008 | Taguchi | G06F 3/0644 | 711/114 |
| 2008/0276057 A1* | 11/2008 | Hetzler | G06F 11/1096 | 711/159 |
| 2009/0106492 A1* | 4/2009 | Muto | G06F 11/1076 | 711/114 |
| 2009/0235042 A1* | 9/2009 | Petrocelli | G06F 1/3203 | 711/170 |
| 2009/0271412 A1* | 10/2009 | Lacapra | H04L 67/1097 | |
| 2010/0070706 A1* | 3/2010 | Inomata | G06F 3/0649 | 711/114 |
| 2010/0100664 A1* | 4/2010 | Shimozono | G06F 3/0611 | 711/103 |
| 2010/0199036 A1* | 8/2010 | Siewert | G06F 3/0613 | 711/112 |
| 2010/0205370 A1* | 8/2010 | Ikawa | G06F 3/0634 | 711/114 |
| 2011/0167215 A1* | 7/2011 | Eguchi | G06F 11/2094 | 711/114 |
| 2011/0191520 A1* | 8/2011 | Kano | G06F 3/0659 | 711/102 |
| 2011/0202723 A1* | 8/2011 | Yochai | G06F 3/0631 | 711/114 |
| 2011/0231594 A1* | 9/2011 | Sugimoto | G06F 3/0616 | 711/103 |
| 2011/0258405 A1* | 10/2011 | Asaki | G06F 3/0631 | 711/162 |
| 2011/0283078 A1* | 11/2011 | Tamura | G06F 3/067 | 711/170 |
| 2012/0005426 A1* | 1/2012 | Sampei | G06F 3/0605 | 711/114 |
| 2012/0185644 A1* | 7/2012 | Kaneko | G06F 3/061 | 711/114 |
| 2012/0254532 A1* | 10/2012 | Hayashi | G06F 3/0631 | 711/114 |
| 2013/0019057 A1* | 1/2013 | Stephens | G06F 3/0638 | 711/103 |
| 2013/0067191 A1* | 3/2013 | Mehra | G06F 3/0644 | 711/173 |
| 2013/0262739 A1* | 10/2013 | Bennett | G06F 3/0632 | 711/102 |
| 2013/0282980 A1* | 10/2013 | Bennett | G06F 3/0611 | 711/114 |
| 2013/0318196 A1* | 11/2013 | Yamamoto | G06F 12/0893 | 709/215 |
| 2013/0339599 A1* | 12/2013 | Sundrani | G06F 3/0653 | 711/114 |
| 2014/0089580 A1* | 3/2014 | Yochai | G06F 3/162 | 711/114 |
| 2014/0089630 A1* | 3/2014 | Pignatelli | G06F 12/1009 | 711/206 |
| 2014/0164715 A1* | 6/2014 | Weiner | G06F 3/0671 | 711/143 |
| 2014/0164728 A1* | 6/2014 | Ouchi | G06F 3/0647 | 711/170 |
| 2014/0282514 A1* | 9/2014 | Carson | G06F 9/45533 | 718/1 |
| 2015/0032980 A1* | 1/2015 | Winokur | G06F 3/0622 | 711/162 |
| 2015/0127854 A1* | 5/2015 | Yamamoto | G06F 3/0629 | 710/5 |
| 2015/0149439 A1* | 5/2015 | Idei | G06F 16/24532 | 707/718 |
| 2015/0154062 A1* | 6/2015 | Watanabe | G06F 11/0751 | 714/26 |
| 2015/0161043 A1* | 6/2015 | Tsuchiyama | G06F 3/0688 | 711/102 |
| 2015/0193170 A1* | 7/2015 | Sundaram | G06F 3/067 | 711/103 |
| 2015/0205668 A1* | 7/2015 | Sundaram | G06F 3/0688 | 714/6.24 |
| 2015/0378613 A1* | 12/2015 | Koseki | G06F 3/0619 | 711/103 |
| 2016/0077745 A1* | 3/2016 | Patel | G06F 12/0246 | 714/704 |
| 2016/0077746 A1* | 3/2016 | Muth | G06F 3/061 | 711/159 |
| 2016/0105715 A1* | 4/2016 | Panje | H04N 17/004 | 725/14 |
| 2016/0259687 A1* | 9/2016 | Yoshihara | G06F 3/0688 | |
| 2016/0292025 A1* | 10/2016 | Gupta | G06F 11/008 | |
| 2016/0320980 A1* | 11/2016 | Fang | G06F 3/0611 | |
| 2016/0335008 A1* | 11/2016 | Dasar | G06F 3/0607 | |
| 2017/0075781 A1* | 3/2017 | Bennett, Jr. | G06F 11/1048 | |
| 2017/0147237 A1* | 5/2017 | Fang | G06F 3/0647 | |
| 2017/0220481 A1* | 8/2017 | McKean | G06F 3/0653 | |
| 2017/0270002 A1* | 9/2017 | Gao | G06F 3/0689 | |
| 2017/0270018 A1* | 9/2017 | Xiao | G06F 3/0617 | |
| 2017/0277631 A1* | 9/2017 | Tsuruya | G11C 29/76 | |
| 2017/0285943 A1* | 10/2017 | Dalmatov | G06F 3/0688 | |
| 2017/0285972 A1* | 10/2017 | Dalmatov | G06F 3/0653 | |
| 2017/0285973 A1* | 10/2017 | Dalmatov | G06F 3/0665 | |
| 2017/0308316 A1* | 10/2017 | Yamamoto | G06F 3/067 | |
| 2017/0364271 A1* | 12/2017 | Han | G06F 11/1076 | |
| 2018/0004452 A1* | 1/2018 | Ganguli | G06F 3/0604 | |
| 2018/0203631 A1* | 7/2018 | Doi | G06F 3/064 | |
| 2018/0349063 A1* | 12/2018 | Matsushita | G06F 3/0665 | |

\* cited by examiner

SYSTEM AND METHOD FOR CREATING MAPPED RAID GROUP DURING EXPANSION OF EXTENT POOL

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, by a computing device, one or more drives added to an extent pool of storage devices. An empty Mapped RAID group may be generated. A plurality of extents in the extent pool may be shuffled. A RAID extent may be mapped to the empty Mapped RAID group, wherein the RAID extent is mapped to the empty Mapped RAID group while shuffling the plurality of extents in the extent pool.

One or more of the following example features may be included. Mapping the RAID extent to the empty Mapped RAID group while shuffling the plurality of extents in the extent pool may include increasing an accessible size of the empty Mapped RAID group while shuffling. It may be determined whether a number of collected free drive extents is at least equal to a RAID extent width. A RAID extent may be constructed with the number of collected free drive extents. An accessible size of a LUN associated with the RAID extent may be increased. It may be determined that an accessible size of the empty RAID group is at least equal to a logical capacity of the empty RAID group. It may be reported to an upper layer that all of the LUN is accessible based upon, at least in part, determining that the accessible size of the empty RAID group is at least equal to the logical capacity of the empty RAID group.

In another example implementation, a computing system may include one or more processors and one or more memories configured to perform operations that may include but are not limited to receiving, by a computing device, one or more drives added to an extent pool of storage devices. An empty Mapped RAID group may be generated. A plurality of extents in the extent pool may be shuffled. A RAID extent may be mapped to the empty Mapped RAID group, wherein the RAID extent is mapped to the empty Mapped RAID group while shuffling the plurality of extents in the extent pool.

One or more of the following example features may be included. Mapping the RAID extent to the empty Mapped RAID group while shuffling the plurality of extents in the extent pool may include increasing an accessible size of the empty Mapped RAID group while shuffling. It may be determined whether a number of collected free drive extents is at least equal to a RAID extent width. A RAID extent may be constructed with the number of collected free drive extents. An accessible size of a LUN associated with the RAID extent may be increased. It may be determined that an accessible size of the empty RAID group is at least equal to a logical capacity of the empty RAID group. It may be reported to an upper layer that all of the LUN is accessible based upon, at least in part, determining that the accessible size of the empty RAID group is at least equal to the logical capacity of the empty RAID group.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, one or more drives added to an extent pool of storage devices. An empty Mapped RAID group may be generated. A plurality of extents in the extent pool may be shuffled. A RAID extent may be mapped to the empty Mapped RAID group, wherein the RAID extent is mapped to the empty Mapped RAID group while shuffling the plurality of extents in the extent pool.

One or more of the following example features may be included. Mapping the RAID extent to the empty Mapped RAID group while shuffling the plurality of extents in the extent pool may include increasing an accessible size of the empty Mapped RAID group while shuffling. It may be determined whether a number of collected free drive extents is at least equal to a RAID extent width. A RAID extent may be constructed with the number of collected free drive extents. An accessible size of a LUN associated with the RAID extent may be increased. It may be determined that an accessible size of the empty RAID group is at least equal to a logical capacity of the empty RAID group. It may be reported to an upper layer that all of the LUN is accessible based upon, at least in part, determining that the accessible size of the empty RAID group is at least equal to the logical capacity of the empty RAID group.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
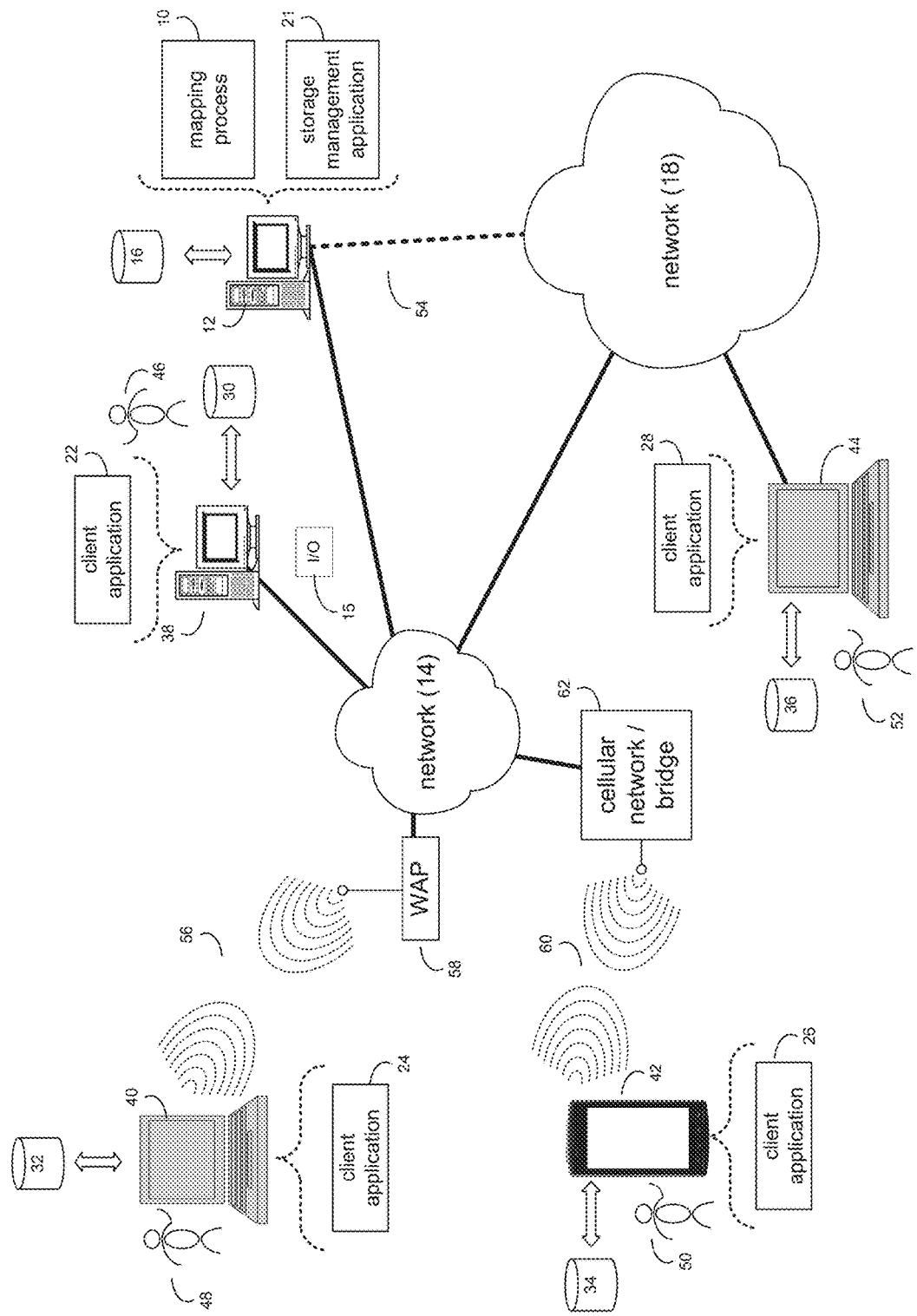
FIG. 1 is an example diagrammatic view of a mapping process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory.

In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown mapping process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a mapping process, such as mapping process 10 of FIG. 1, may receive, by a computing device, one or more drives added to an extent pool of storage devices. An empty Mapped RAID group may be generated. A plurality of extents in the extent pool may be shuffled. A RAID extent may be mapped to the empty Mapped RAID group, wherein the RAID extent is mapped to the empty Mapped RAID group while shuffling the plurality of extents in the extent pool.

In some implementations, the instruction sets and subroutines of mapping process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, mapping process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, mapping process 10 and/or storage management application 21 may be accessed via one or more of client applications 22, 24, 26, 28. In some implementations, mapping process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within mapping process 10, a component of mapping process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of mapping process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of mapping process 10 (and vice versa). Accordingly, in some implementations, mapping process 10 may be a purely server-side application, a purely client-side application, or a hybrid server-side/client-side application that is cooperatively executed by one or more of client applications 22, 24, 26, 28 and/or mapping process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, mapping process 10, and storage management application 21, taken singly or in any combination, may effectuate some or all of the same functionality, any description of effectuating such functionality via one or more of client applications 22, 24, 26, 28, mapping process 10, storage management application 21, or combination thereof, and any described interaction(s) between one or more of client applications 22, 24, 26, 28, mapping process 10, storage management application 21, or combination thereof to effectuate such functionality, should be taken as an example only and not to limit the scope of the disclosure.

In some implementations, one or more of users 46, 48, 50, 52 may access computer 12 and mapping process 10 (e.g., using one or more of client electronic devices 38, 40, 42, 44) directly through network 14 or through secondary network 18. Further, computer 12 may be connected to network 14 through secondary network 18, as illustrated with phantom link line 54. Mapping process 10 may include one or more user interfaces, such as browsers and textual or graphical user interfaces, through which users 46, 48, 50, 52 may access mapping process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
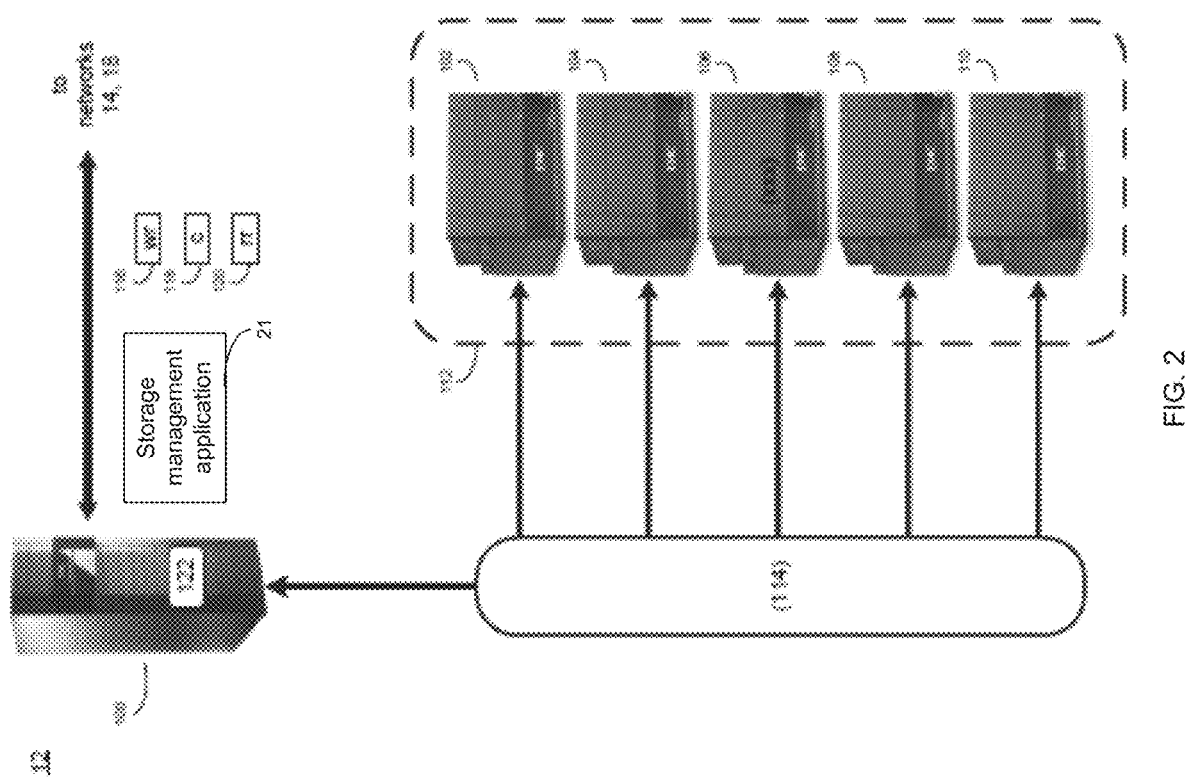
FIG. 2 is an example diagrammatic view of a computer of FIG. 1 according to one or more example implementations of the disclosure.
Figure 3:
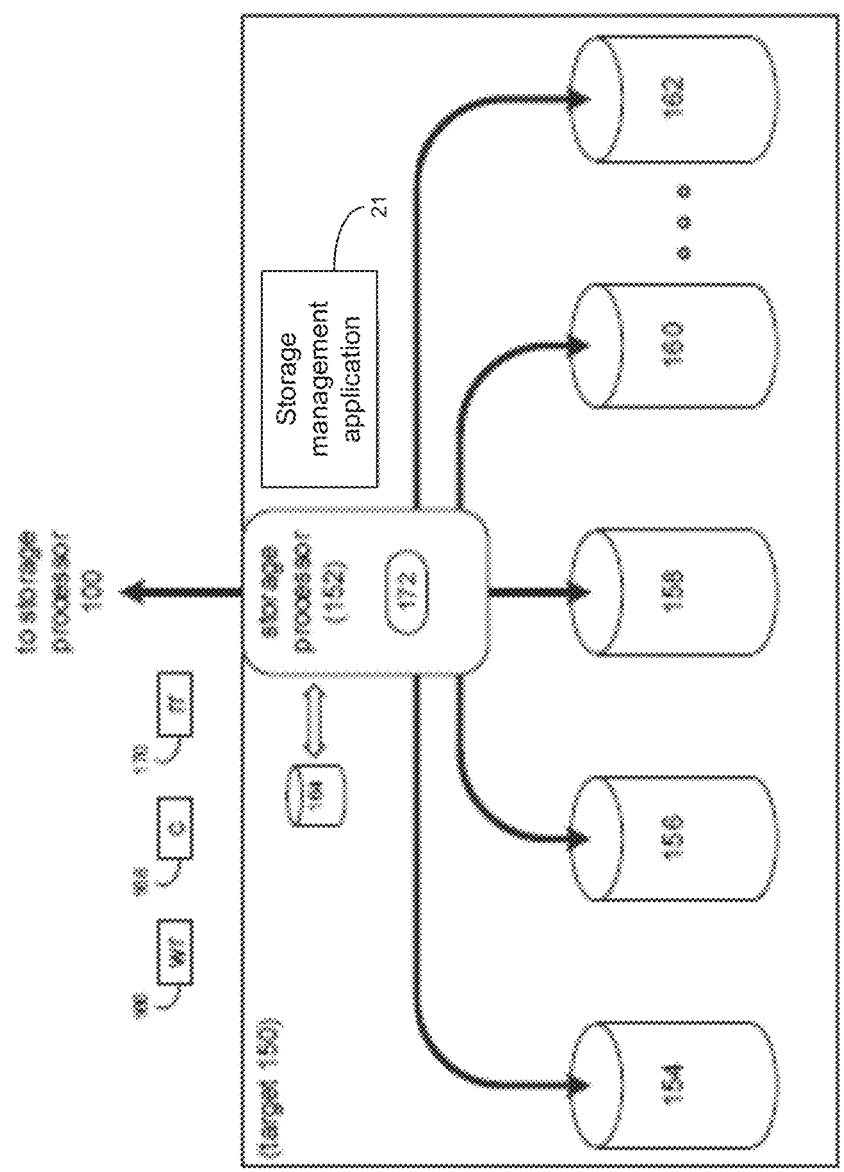
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or mapping process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/ performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/ capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
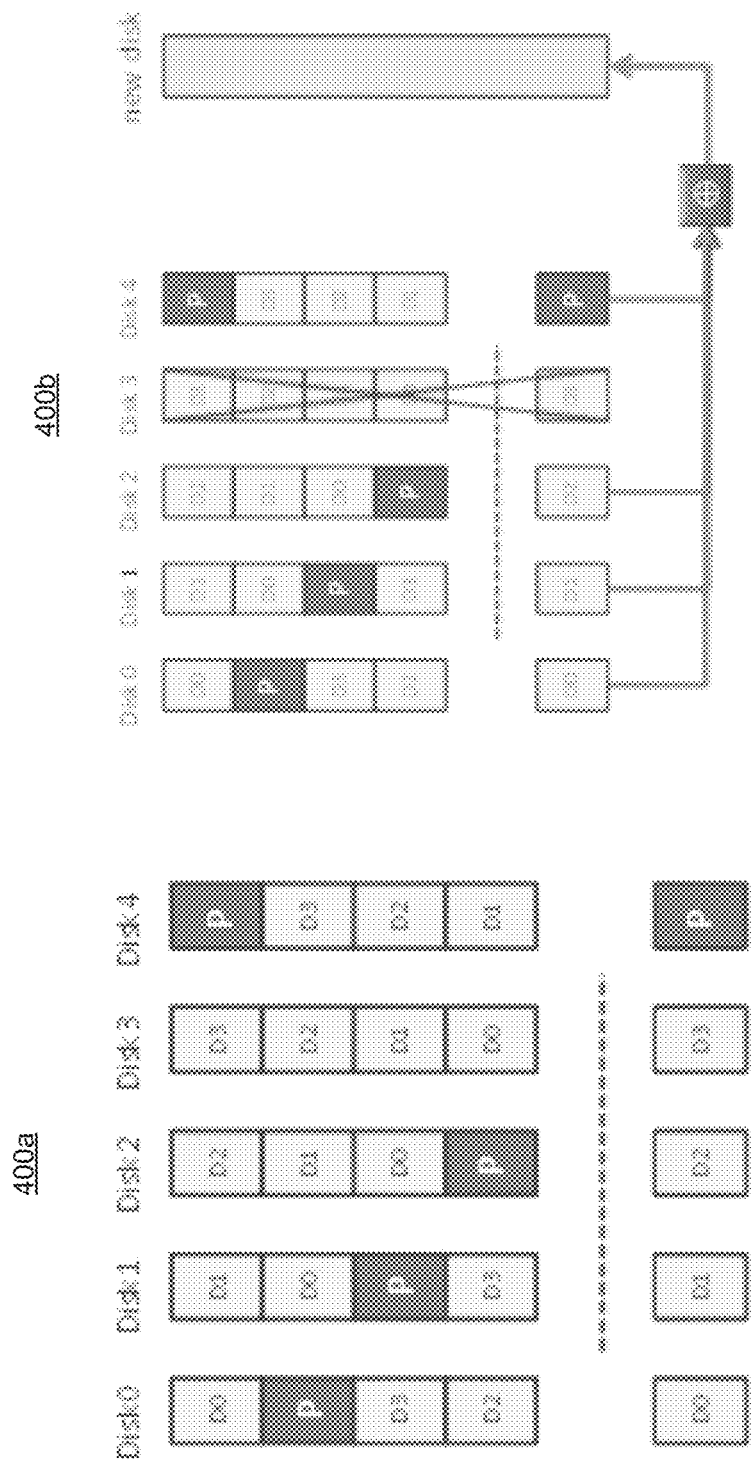
FIG. 4 is an example diagrammatic view of a RAID layout of FIG. 1 according to one or more example implementations of the disclosure.

Example RAID Group:

As discussed above, and referring at least to the example implementation of FIG. 4, an example 4D+1P RAID 5 layout 400a that may be managed (e.g., via storage management application 21) is shown. In the example, data may be distributed across the storage devices (e.g., drives) in one of several ways, referred to as RAID levels, depending on the required level of redundancy and performance. As noted above, while one or more of the figures may shows disks as the storage device, it will be appreciated that any of the storage devices discussed throughout may be used.

Shown for example purposes only, RAID 5 may consist of block level striping with distributed parity. Parity information may be distributed among the drives. In the above example, each stripe may consist of five blocks, which may include four data blocks (e.g., D0, D1, D2, D3) and one parity block (e.g., P). Upon failure of a single drive, subsequent reads may be calculated from the distributed parity such that no data is lost. At the same time, a "hot spare" storage device may be selected to replace the dead storage device, and all the data on the failed drive may be rebuilt and written to the new drive. For instance, and referring at least to the example implementation of FIG. 4, an example RAID 5 rebuild 400b of the example 4D+1P RAID 5 layout of 400a is shown.

As storage device capacity increases, the rebuild time may also increase. As a result, there may be an increased risk of a double storage device failure, which may lead to data loss. It will be appreciated that the rebuild time may be subject to the write bandwidth of the hot spare storage device, which may become a bottleneck. In some situations, it may be difficult to reduce the rebuild time for RAID. In some implementations, Mapped RAID technology have help resolve this issue.

Figure 5:
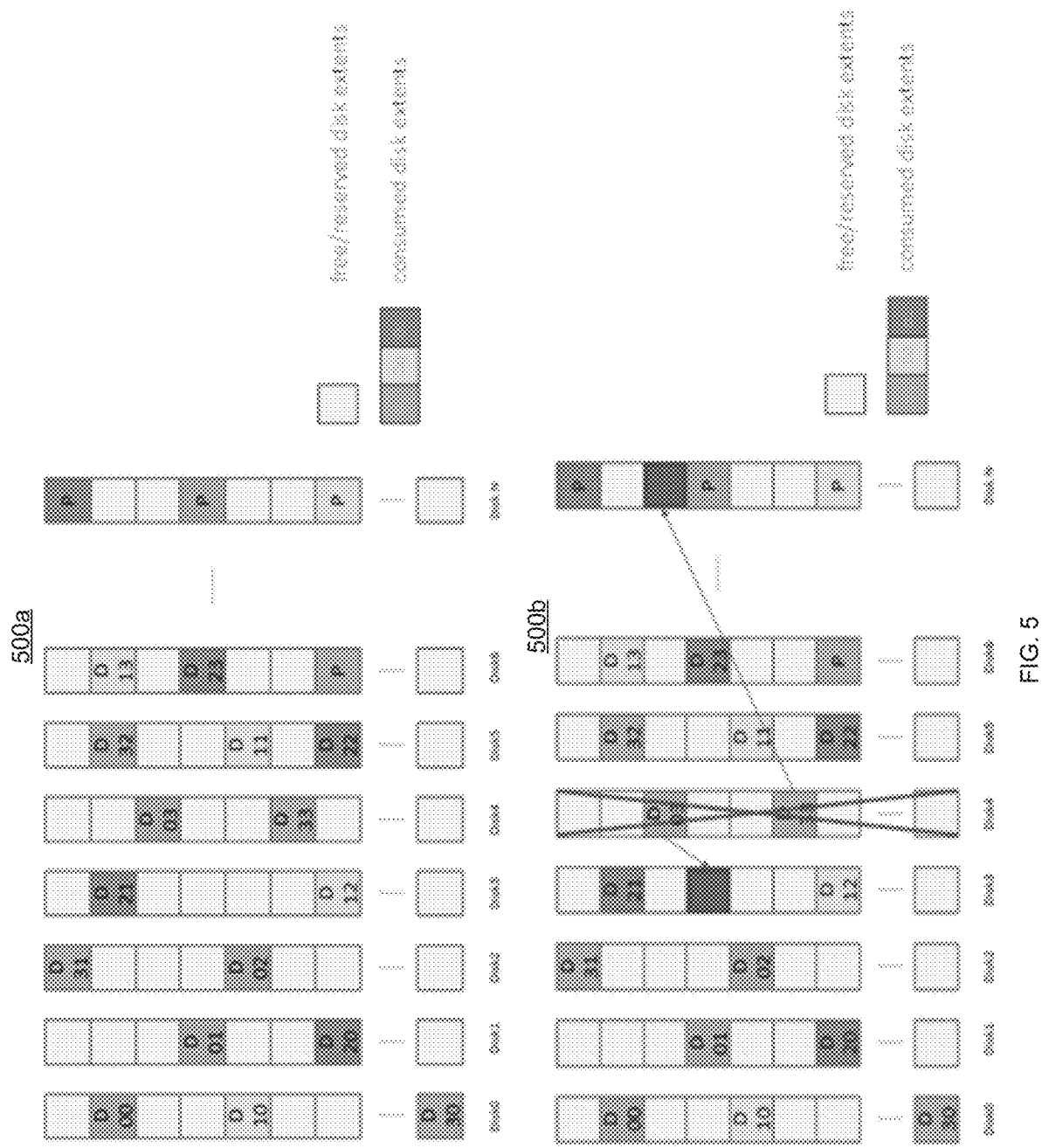
FIG. 5 is an example diagrammatic view of a Mapped RAID extent layout of FIG. 1 according to one or more example implementations of the disclosure.

Example Mapped RAID Group:

In some implementations, and referring at least to the example implementation of FIG. 5, an example Mapped RAID extent layout 500a managed (e.g., via storage management application 21) is shown (e.g., a 4D+1P RAID 5 over N disks, where N is greater than 5). Generally, Mapped RAID may be created on top of a disk (or other storage device) pool, which may include N disks (or other storage devices). Broadly speaking, each disk may be viewed as a set of continuous, non-overlapping, fixed sized disk extents. In the example of FIG. 5, while creating a RAID extent, 5 disk extents may be selected from 5 different disks. Some disk extents on each disk may be reserved as hot spare disk extents (e.g., instead of reserving the whole disk as a hot spare disk, which may be typical with a traditional RAID group).

Generally, it may be expected that storage management application 21 may evenly distribute the RAID extents to all disks in the pool, and further expected that all disk space is consumed no matter whether their capacity is the same or not. Typically, when one disk fails, the replacement may be found from other live disks for each disk extent on the dead drive. For instance, and referring at least to the example implementation of FIG. 5, an example disk extent replacement during disk fail in Mapped RAID layout 500b of the example Mapped RAID extent layout 500a is shown. Generally, an example limitation for the disk extents selection may be that there should be a guarantee that each RAID extent straddles 5 different disks (e.g., assuming the layout in FIG. 5). Moreover, storage management application 21 may be expected to distribute the dead disk extent replacements evenly to live disks.

Example RAID Extent Layout

In some implementations, one Mapped RAID group may be a set of ordered RAID extents. When creating a Mapped RAID group, storage management application 21 may need to allocate many RAID extents from the extent pool. As noted above, one RAID extent may need a RAID width number of disk extents from different disks in the extent pool. Generally, storage management application 21 may allocate the RAID extents one by one. For ease of explanation only, assume the disk number in the pool is N, and the RAID extent width is M. In the example, there should be $\mathcal{C}_n^m$ possible ways to combine a RAID extent. A typical case may be for storage management application 21 to create 4D+1P mapped RAID 5 on top of 16 disks, where there are $\mathcal{C}_{16}^5 = 4368$ ways to allocate a RAID extent on top of 16 disks. In some implementations, for each RAID extent allocation, storage management application 21 may loop over all the possible choices, and select the best one. In the example, the searching depth may be $\mathcal{C}_n^m$.

Example Mapped RAID and Extent Pool Topology

Figure 6:
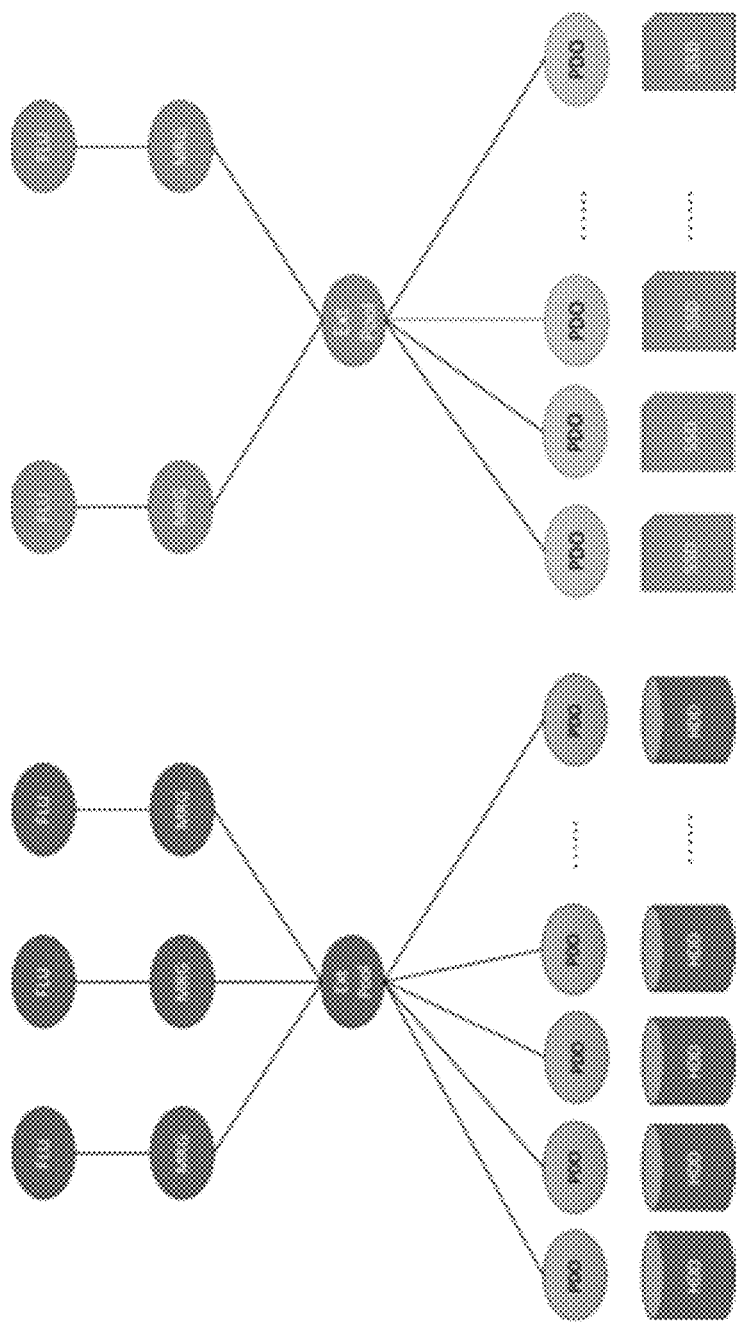
FIG. 6 is an example diagrammatic view of an example topology of Mapped RAID and Extent Pool according to one or more example implementations of the disclosure.

Referring at least to the example implementation of FIG. 6, an example topology 600 of Mapped RAID and Extent Pool is shown. In some implementations, the extent pool may support both SSDs and HDDs together. A physical drive object (PDO) may be used to describe each drive, which may include the drive type, sector size, and performance tier, etc. In the example, all drives in the extent pool should have the similar characteristic. In the extent pool, each disk may be split into a set of disk extents, where a number of disk extents may be selected and composed together and a Mapped RAID object may operate a RAID algorithm on the them. Generally, each extent pool may, e.g., (1) include anywhere from a small number of drives to hundreds of drives (or more or less), (2) there may be more than one Mapped RAID object created on it, and they may share the same set of drives in the extent pool, and (3) each Mapped RAID object may expose their capacity to a multi-core cache (MCC) through a Flare LUN (FLU).

Mapped RAID Position in the I/O Stack

Figure 7:
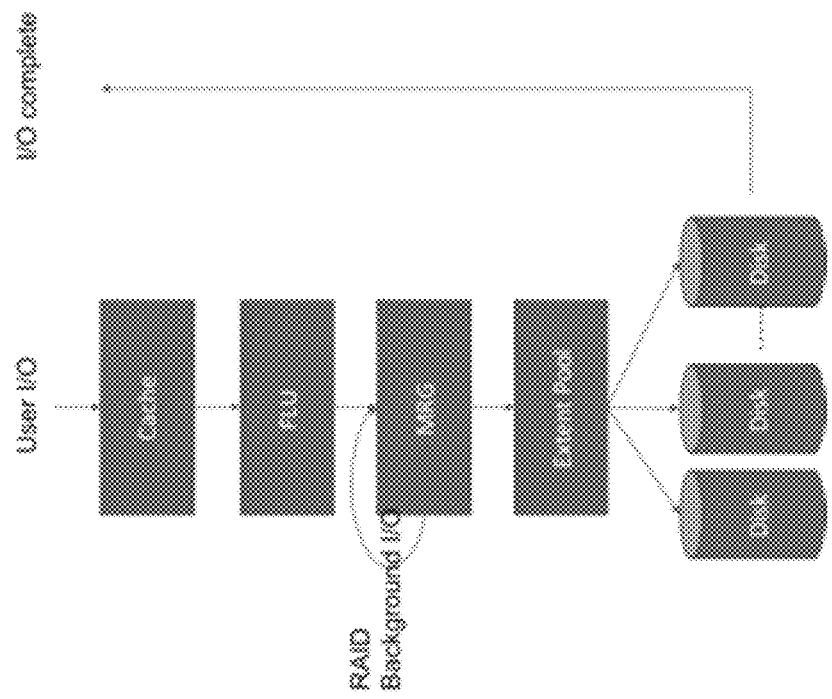
FIG. 7 is an example diagrammatic view of an example Mapped RAID position in an I/O stack according to one or more example implementations of the disclosure.

Referring at least to the example implementation of FIG. 7, an example Mapped RAID position in an I/O stack 700 is shown. As noted above, Mapped RAID may be generally created on top of an extent pool, which is a collection of disks (or other storage device type). The space of Mapped RAID may be exposed to a multi-core cache (MCC) through a Flare LUN (FLU). MCC in the storage system may act as a buffer cache. Memory in the MCC may be organized into memory pages. A memory page may be, e.g., an 8 KB size. From the system perspective, a user I/O may first go to the MCC first. When a read I/O is sent to the MCC, the I/O may allocate memory pages in the MCC, and then send to the FLU, where Mapped RAID may break the I/O down to disk extents according to RAID geometry, and then the extent pool may forward the I/O to downstream disks. After the I/O is returned back, the user data may generally be said to have been read into memory pages. Generally, when a write I/O is sent to the MCC, the I/O data may be copied to the MCC's memory pages (or the memory may be allocated from the memory managed by the MCC, so data copy may be avoided), and then the write I/O may be completed. When some condition is met e.g., lack of free page or timer triggered, a background flush may be triggered. The MCC may flush dirty pages to the backend. The MCC may flush dirty pages sequentially in logical block address (LBA) increasing order. Thus, the MCC flush I/O pattern may be sequentially oriented. Generally, the host sends the 8K random write I/O to the MCC, and the MCC may reorganize these random host I/Os to sequentially flush the I/Os and send down to the FLU. The flush I/O may go through the software stack top and down just like the read I/O. This kind of behavior for the MCC's may require that the FLU and Mapped RAID should optimize sequential write I/O performance In some implementations, and referring at least to the example FIG. 8, an additional example of Mapped RAID 800 is shown. In the example, Mapped RAID may extend the RAID techniques beyond using physical drives entirety to utilizing pieces of physical drives (extents). As noted above, a physical drive may be partitioned into a set of drive extents. With Mapped RAID, a single physical drive may be part of multiple RAID collections where each of the physical drive's drive extents may be part of a different RAID collection. This may allow the rebuild process to rebuild a failed drive faster as more drives may be used in the rebuild process compared to when the failed drive is part of just one collection.

In some uses, Mapped RAID may incorporate spare capacity spread across several physical drives within a storage pool to be used when rebuilding a failed drive, instead of rebuilding directly to dedicated spare drives. This distributed spare space may allow for faster rebuild times compared to a dedicated spare as more drives are involved in the rebuild. The faster rebuild times afforded by Mapped RAID may increase the reliability and availability of the overall system, at least because it may increase the likelihood of the rebuild process completing the rebuilding of a failed drive before additional failures in the same RAID collection happen and cause data loss (by exceeding the collection's redundancy).

Generally, after an extant pool is created and the end user/administrator discovers that current extent pool space cannot meet their storage requirements, and the spare drive extents are not enough to build a new RAID group, new drives may be required to be added to the extent pool to expand the storage pool's capability. If the existing extent pool is expanded with new disk(s) added, the extent pool will do a shuffle operation, which will re-distribute disk extents across all disks including the newly added ones.

During the shuffle process, some disk extents in the old disks may be migrated to the newly added disks based on disk extent distribution strategy.

Generally, when expanding the extent pool's capability by adding new drives to the extent pool, the new drives are added to the extent pool and partitioned into drive extents at the same time, and then the empty drive extents are re-dispersed/shuffled. Typically, a new RAID group and FLU only can be created after the re-dispersing/shuffling is finished.

Figure 8:
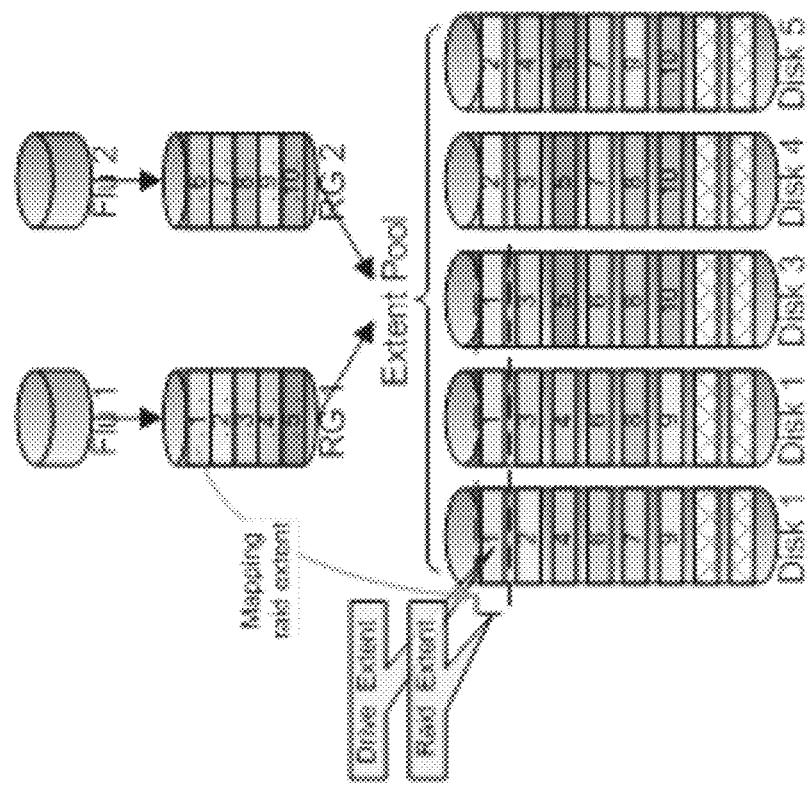
FIG. 8 is an example diagrammatic view of an example Mapped RAID according to one or more example implementations of the disclosure.
Figure 9:
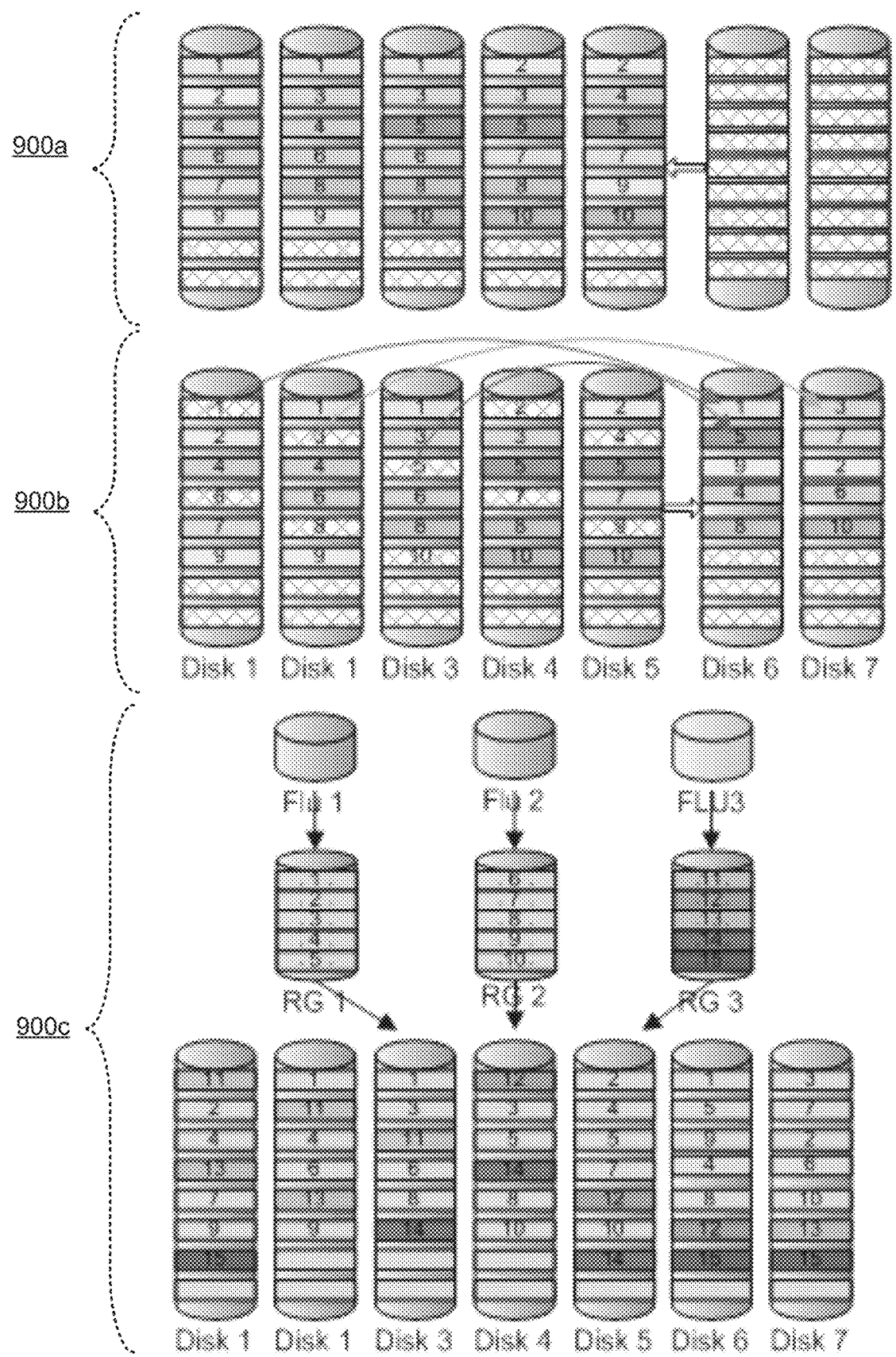
FIG. 9 is an example diagrammatic view of example RAID extent pools according to one or more example implementations of the disclosure.
Figure 10:
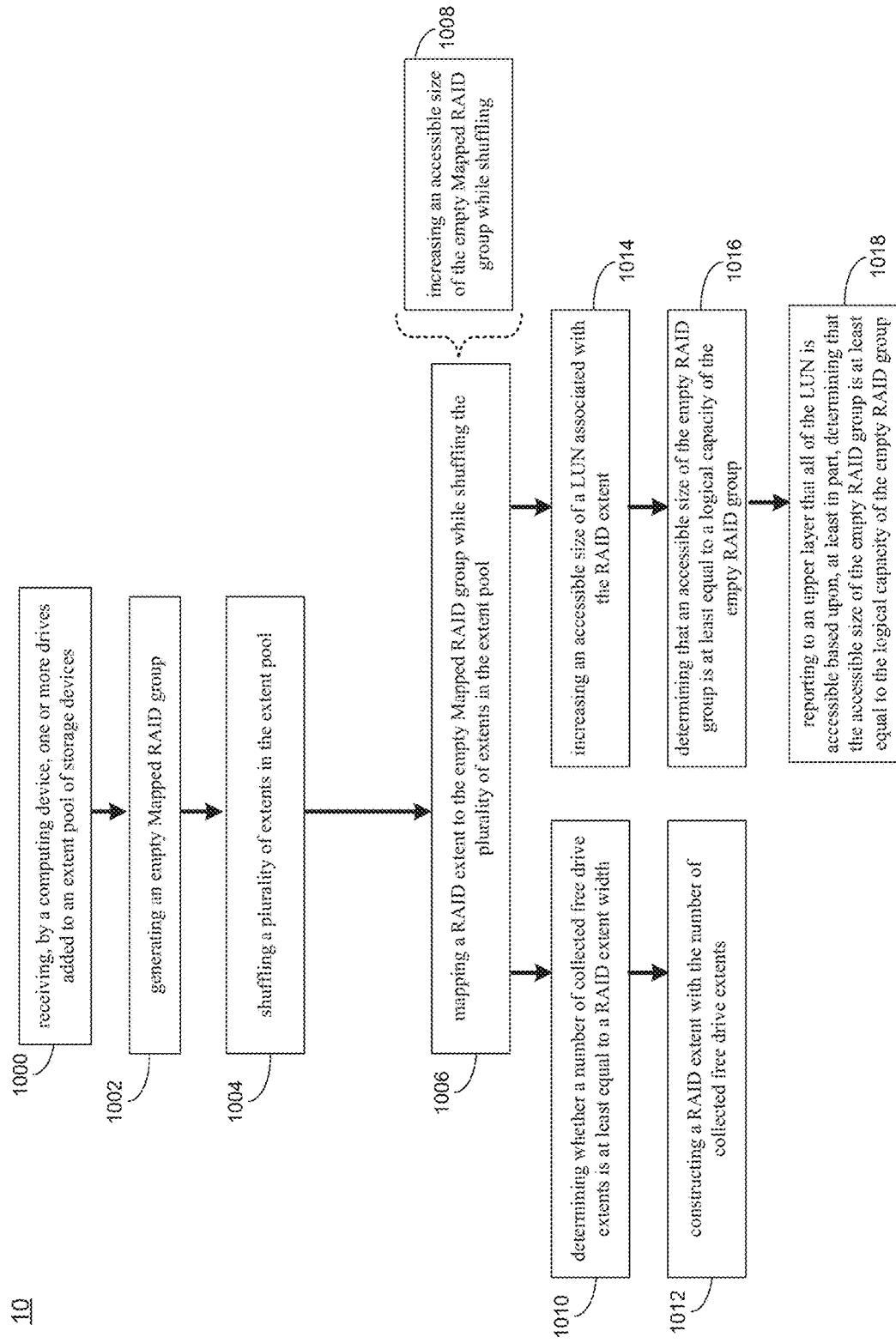
FIG. 10 is an example flowchart of a mapping process according to one or more example implementations of the disclosure.
Figure 11:
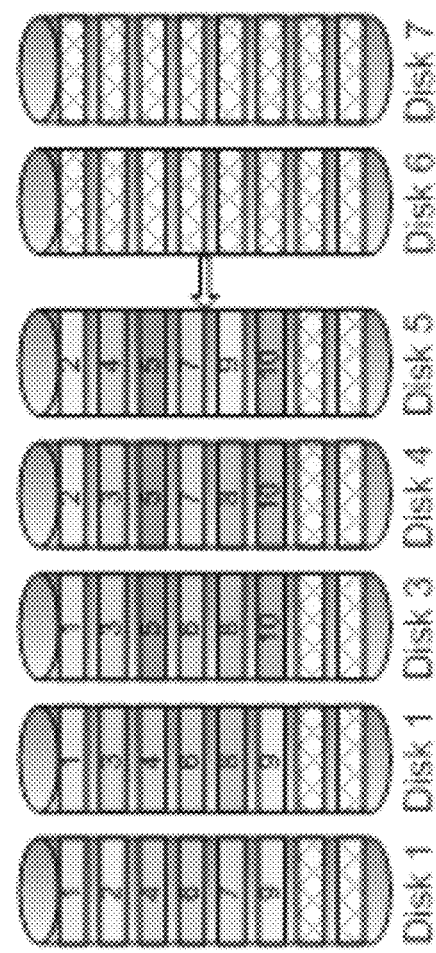
FIG. 11 is an example diagrammatic view of an example storage layout according to one or more example implementations of the disclosure.
Figure 12:
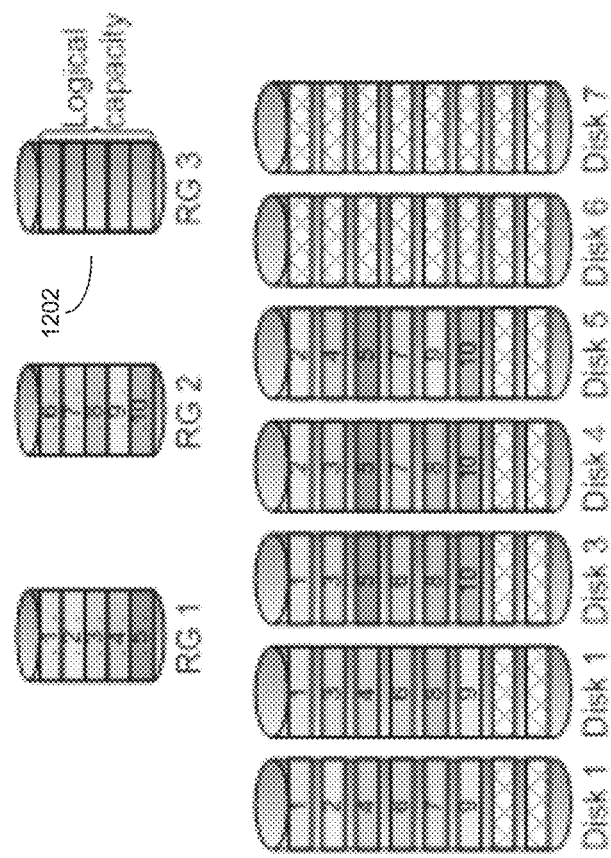
FIG. 12 is an example diagrammatic view of an example storage layout according to one or more example implementations of the disclosure.
Figure 13:
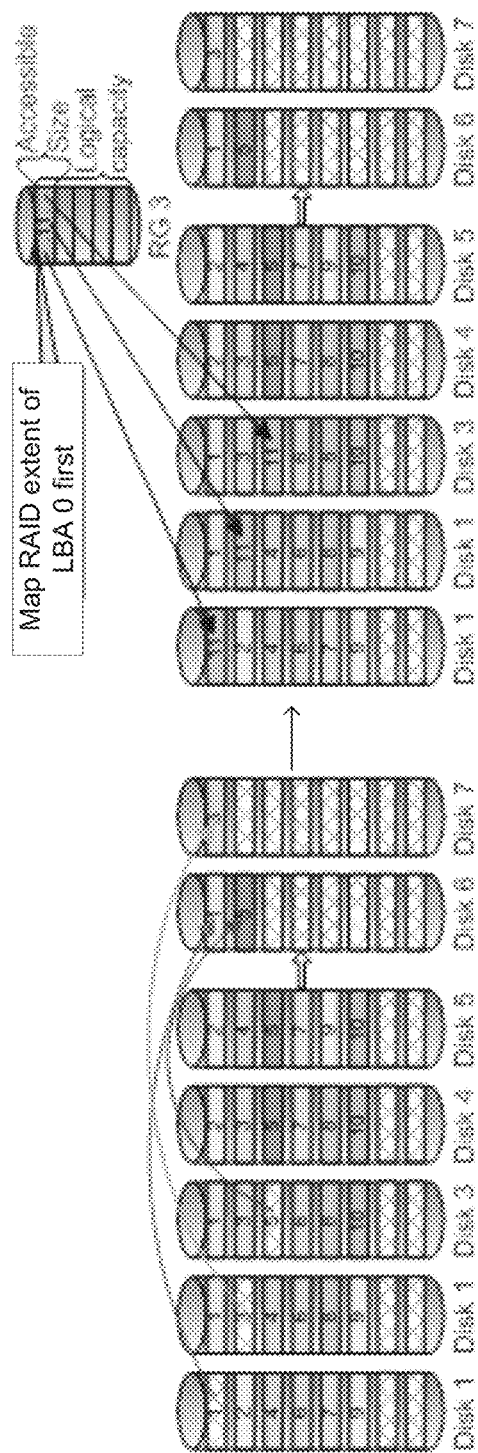
FIG. 13 is an example diagrammatic view of an example storage layout according to one or more example implementations of the disclosure.
Figure 14:
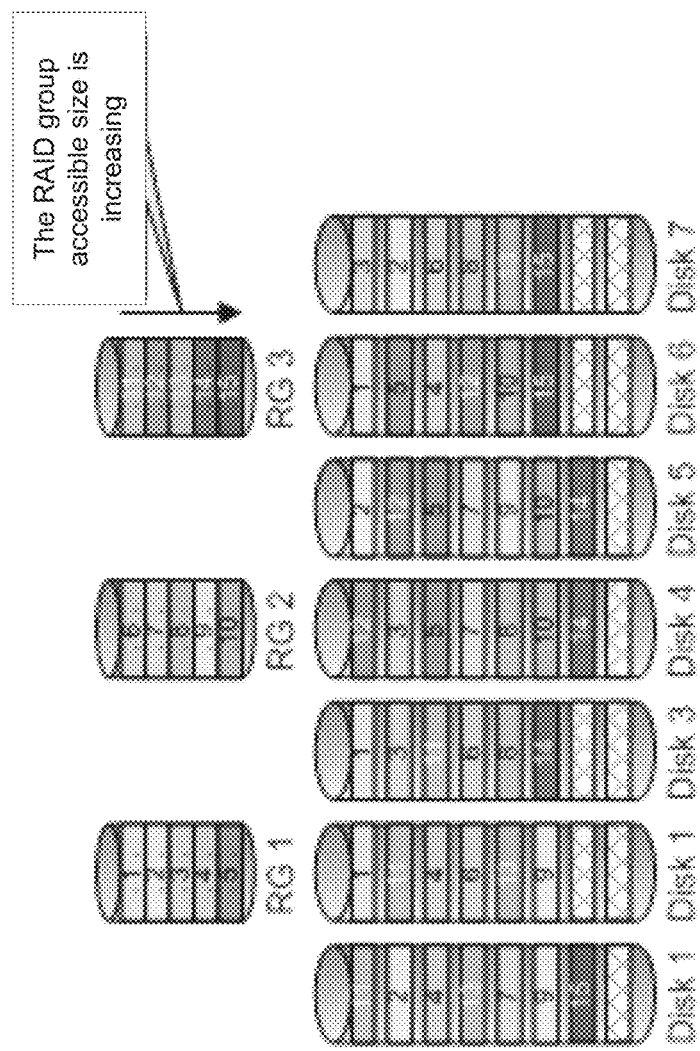
FIG. 14 is an example diagrammatic view of an example storage layout according to one or more example implementations of the disclosure.

For instance, and referring at least to the example FIG. 9, a diagrammatic view of adding new drives to an extent pool is shown. Using the example extent pool from FIG. 8, FIG. 9 shows adding new drives to the extent pool in 900a, which has two RAID groups (e.g., RG1 & RG2). Typically, mapping process 10 may partition the new drives into drive extents, and mark the newly added drive extents as spare drive extents. Next, storage management application 21 may typically shuffle the drive extents after the new drive extents are added to extent pool (as shown in 900b). After shuffling is complete, storage management application 21 may create a new RAID Group (RG3) and LUN FLU3 with the freed drive extents (as shown in 900c), and may then export the FLU to upper layer drivers.

Using known techniques for expanding extent pools, the new RG/FLU only may be created after shuffling is finished. The shuffling operation often takes a long time, at least for several hours or even a few days. That means the expanded physical storage space will not be able to be used in a short amount of time. When expanding the extent pool, storage management application 21 should shuffle the drive extents, but the RAID group is not able to be created during shuffling. Meanwhile, because the shuffling may take a long time, once storage management application 21 begins expanding the extent pool, storage management application 21 has to wait for a long time to create the new RAID group, and thus access to the whole storage space may be unavailable until the new RAID group is created.

Thus, as will be discussed below, mapping process 10 may enable faster RAID group creation during disk extent pool expansion and shuffle. When expanding the disk extent pool, mapping process 10 may create an empty Mapped RAID group after the new drives are added to the extent pool, where the RAID group accessible size may be increased gradually during the shuffling of the drive extents. Moreover, the FLU on the RAID group may be created and exported to the upper layer driver once the RAID group is created. As a result, instead of being required to wait until drive extent shuffling is finished, mapping process 10 may create a new RAID group and the FLU may be created and exported, allowing partial logical storage spaces to be accessible by the upper layer driver, as well as enabling storage pool space to be increased after a shorter period of time (e.g., tens of minutes compared with several hours or tens of hours).

As will be discussed below, mapping process 10 may at least help, e.g., the improvement of an existing storage technology, necessarily rooted in computer technology in order to overcome an example and non-limiting problem specifically arising in the realm of data storage. For instance, mapping process 10 may use an efficient process to improve extent pool expansion performance on Mapped RAID.

The Mapping Process:

As discussed above and referring also at least to the example implementations of FIGS. 10-14, mapping process 10 may receive 1000, by a computing device, one or more drives added to an extent pool of storage devices. Mapping process 10 may generate 1002 an empty Mapped RAID group. Mapping process 10 may shuffle 1004 a plurality of extents in the extent pool. Mapping process 10 may map 1006 a RAID extent to the empty Mapped RAID group, wherein the RAID extent is mapped 1006 to the empty Mapped RAID group while shuffling 1004 the plurality of extents in the extent pool.

In some implementations, mapping process 10 may receive 1000, by a computing device, one or more drives added to an extent pool of storage devices. For instance, and referring at least to the example implementation of FIG. 11, an example storage layout 1100 is shown. In the example, assume for example purposes only that after an extant pool is created and the end user/administrator discovers that current extent pool space cannot meet their storage requirements, new drives (e.g., disk 6 and disk 7) are added to the extent pool and received 1000 by mapping process 10 to expand the storage pool's capability. Thus, in the example, the new drives and their drive extents may be added to the extent pool.

In some implementations, mapping process 10 may generate 1002 an empty Mapped RAID group. For instance, and referring at least to the example implementation of FIG. 12, an example storage layout 1200 with an empty Mapped RAID group (e.g., empty Mapped RAID group 1202) is shown. In the example, and compared with former disk extent pool expansion approaches, mapping process 10 may generate 1002 an empty Mapped RAID group and FLU from the extent pool when disks are added to extent pool. An "empty" Mapped RAID group may be a RAID group instance that is generate 1002 and has its logical capacity specified, but where the mapping of the logical addresses to physical storage spaces is empty, and no logical storage space is accessible in the empty Mapped RAID group. For instance, after the drives are added to the pool, mapping process 10 (e.g., via Mapped RAID) may generate 1002 an empty RAID group (RG 3) and specify its capacity before or while the above-noted shuffling occurs. Mapping process 10 may generate a zero accessible sized LUN on RG 3, where after, mapping process 10 may export the FLU to upper layer driver (e.g., DRAM Cache) in the stack. Moreover, when the empty RAID group (RG 3) is generated, the mapping of its RAID extents may be empty, and the FLU's accessible size may be zero, and as such, mapping process 10 may report via the FLU the zero accessible size and its total logical capacity, e.g., to its user.

In some implementations, mapping process 10 may shuffle 1004 a plurality of extents in the extent pool. For instance, since in the above example the existing extent pool is expanded with new disks added, mapping process 10 may shuffle 1004 the extent pool, which will re-distribute the disk extents across the disks, including the newly added ones (e.g., disk 6 and disk 7). During the shuffle process, some disk extents in the old disks may be migrated to the newly added disks based on disk extent distribution strategy.

In some implementations, mapping process 10 may map 1006 a RAID extent to the empty Mapped RAID group, wherein the RAID extent is mapped 1006 to the empty Mapped RAID group while shuffling 1004 the plurality of extents in the extent pool. For instance, and referring at least to the example implementation of FIG. 13 and FIG. 14, an example storage layout 1300 visualizing the mapping 1006 of one or more RAID extents to the empty Mapped RAID group (RG 3), and an example storage layout 1400 visualizing the gradual increase of the accessible size of RG 3 is shown is shown. In the example, during shuffling 1004, and once mapping process 10 determines that there are enough freed drive extent for assembling a RAID extent, mapping process 10 may create and map 1006 the raid extent to the lowest logical block address (LBA) of RG 3, which in this example is zero LBA.

In some implementations, mapping 1006 the RAID extent to the empty Mapped RAID group while shuffling the plurality of extents in the extent pool may include increasing 1008 an accessible size of the empty Mapped RAID group while shuffling. For instance, continuing with the above example, since mapping process 10 has created and mapped 1006 the RAID extent to the lowest logical block address (LBA) of RG 3, which in this example is zero LBA, RG 3 has become at least partial mapped 1006 to RG 3, where mapping process 10 may (via the FLU) report to the upper layer driver (e.g., DRAM Cache) that the accessible size is increased 1008. During shuffling of the disk extents, mapping process 10 may generate and map more RAID extents to RG 3 with freed drive extents using the next lowest LBA of RG 3 during each iteration. Thus, the accessible size of RG 3 is increasing gradually. When RG 3 is fully mapped, mapping process 10 may (via the FLU) report to the upper layer driver (e.g., DRAM Cache) that the entirety of RG 3 is accessible, when all of RG 3 logical addresses may be read from and written to as usual. Thus, by contrast to prior implementations that are required to wait until the entire shuffling process is complete to access, after the upper layer driver receives the accessible LUN size increased notification, mapping process 10 may write to or read from the corresponding storage spaces, even though shuffling has not yet completed for the entire extent pool.

In some implementations, mapping process 10 may determine 1010 whether a number of collected free drive extents is at least equal to a RAID extent width. For instance, as noted above, during shuffling 1004, and once mapping process 10 determines that there are enough freed drive extent for assembling a RAID extent, mapping process 10 may create and map 1006 the raid extent to the lowest logical block address (LBA) of RG 3. To determine 1010 whether there are enough freed drive extents, when a particular shuffling of a disk extent (as opposed to the shuffling of the entire extent pool) is complete, mapping process 10 may determine 1010 whether there are enough freed drive extents to construct a new RAID extent in RG 3. For example, while the shuffling of the remaining extent pool is ongoing, mapping process 10 may poll the shuffling progress. In the example, when mapping process 10 finds that a particular drive extent shuffling is completed, mapping process 10 may attempt to collect free drive extents from different member disks for constructing the RAID extent. If mapping process 10 determines that the collected free drive extents number is less than the RAID width, there may be an insufficient number of free drive extents to construct the RAID extent, where mapping process 10 may wait for shuffling of the next drive extent being completed before making another determination 1010.

In some implementations, mapping process 10 may construct 1012 a RAID extent with the number of collected free drive extents. For instance, if mapping process 10 determines that the collected freed drive extents number is greater than or equal to the RAID width, there may be enough free drive extents to construct the RAID extent, and may do so with the collected freed drive extents, mapping the RAID extent to the newly created (empty) RG 3 (which as noted above may increase the accessible size of RG 3).

In some implementations, mapping process 10 may increase 1014 an accessible size of a LUN associated with the RAID extent. For instance, after the accessible size of RG 3 is increased, mapping process 10 may increase 1014 the accessible size of the LUN associated with the RAID extent. Similarly to the discussion above, mapping process 10 may (via the FLU) report to the upper layer driver (e.g., DRAM Cache) that the accessible size of the LUN is increased, and when the upper layer driver receives the notification, mapping process 10 may be able to write to and/or read from the increased logical space.

In some implementations, mapping process 10 may determine 1016 that an accessible size of the empty RAID group is at least equal to a logical capacity of the empty RAID group. For instance, after the accessible size is increased, mapped process 10 may determine whether the current accessible size of RG 3 is still less than its total logical capacity. In some implementations, mapping process 10 may report 1018 to an upper layer that all of the LUN is accessible based upon, at least in part, determining that the accessible size of the empty RAID group is at least equal to the logical capacity of the empty RAID group. For example, if the current accessible size of RG 3 is equal to its logical capacity, all logical addresses may be determined to have been mapped, where mapping process 10 may mark RG 3 as being fully mapped and the entire LUN may be accessible (e.g., mapping process 10 may read from and/or write to all of the LUN logical spaces). On the other hand, if the current accessible size of RG 3 is not equal to its logical capacity, mapping process 10 may determine that RG 3 is still not fully mapped, where mapping process 10 may (as noted above) wait for the shuffling and mapping of another RAID extent.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, one or more drives added to an extent pool of storage devices;
beginning with a plurality of existing Mapped RAID groups, generating an empty Mapped RAID group in response to receiving the one or more drives added to the extent pool of storage devices, wherein the empty Mapped RAID group has a defined logical capacity, an empty mapping of one or more logical addresses to one or more physical storage spaces, and an accessible size of zero;
shuffling a plurality of extents in the extent pool among the plurality of existing Mapped RAID groups and the empty Mapped RAID group;
mapping a RAID extent to the empty Mapped RAID group, wherein the RAID extent is mapped to the empty Mapped RAID group while shuffling the plurality of extents in the extent pool, wherein mapping the RAID extent to the empty Mapped RAID group while shuffling the plurality of extents in the extent pool includes increasing the accessible size of the empty Mapped RAID group by a size of the RAID extent while shuffling in response to mapping the RAID extent to the empty Mapped RAID group;
increasing an accessible size of a Flare LUN associated with the empty Mapped RAID group by the size of the RAID extent mapped to the empty Mapped RAID group, wherein the size of the empty Mapped RAID group is exposed to a multi-core cache through the Flare LUN;
determining that an accessible size of the empty Mapped RAID group is at least equal to a logical capacity of the empty Mapped RAID group; and
reporting to an upper layer that all of the Flare LUN is accessible in response to determining that the accessible size of the empty Mapped RAID group is at least equal to the logical capacity of the empty Mapped RAID group.

2. The computer-implemented method of claim 1 further comprising determining whether a number of collected free drive extents is at least equal to a RAID extent width.

3. The computer-implemented method of claim 2 further comprising constructing a RAID extent with the number of collected free drive extents.

4. A computer program product residing on a non-transitory computer readable storage medium having a plurality of instructions stored thereon which, when executed across one or more processors, causes at least a portion of the one or more processors to perform operations comprising:
receiving one or more drives added to an extent pool of storage devices;
beginning with a plurality of existing Mapped RAID groups, generating an empty Mapped RAID group in response to receiving the one or more drives added to the extent pool of storage devices, wherein the empty Mapped RAID group has a defined logical capacity, an empty mapping of one or more logical addresses to one or more physical storage spaces, and an accessible size of zero;
shuffling a plurality of extents in the extent pool among the plurality of existing Mapped RAID groups and the empty Mapped RAID group;
mapping a RAID extent to the empty Mapped RAID group, wherein the RAID extent is mapped to the empty Mapped RAID group while shuffling the plurality of extents in the extent pool, wherein mapping the RAID extent to the empty Mapped RAID group while shuffling the plurality of extents in the extent pool includes increasing the accessible size of the empty Mapped RAID group by a size of the RAID extent while shuffling in response to mapping the RAID extent to the empty Mapped RAID group;
increasing an accessible size of a Flare LUN associated with the empty Mapped RAID group by the size of the RAID extent mapped to the empty Mapped RAID group, wherein the size of the empty Mapped RAID group is exposed to a multi-core cache through the Flare LUN;
determining that an accessible size of the empty Mapped RAID group is at least equal to a logical capacity of the empty Mapped RAID group; and
reporting to an upper layer that all of the Flare LUN is accessible in response to determining that the accessible size of the empty Mapped RAID group is at least equal to the logical capacity of the empty Mapped RAID group.

5. The computer program product of claim 4 wherein the operations further comprise determining whether a number of collected free drive extents is at least equal to a RAID extent width.

6. The computer program product of claim 5 wherein the operations further comprise constructing a RAID extent with the number of collected free drive extents.

7. A computing system including one or more processors and one or more memories configured to perform operations comprising:
receiving one or more drives added to an extent pool of storage devices;
beginning with a plurality of existing Mapped RAID groups, generating an empty Mapped RAID group in response to receiving the one or more drives added to the extent pool of storage devices, wherein the empty Mapped RAID group has a defined logical capacity, an empty mapping of one or more logical addresses to one or more physical storage spaces, and an accessible size of zero;
shuffling a plurality of extents in the extent pool among the plurality of existing Mapped RAID groups and the empty Mapped RAID group;
mapping a RAID extent to the empty Mapped RAID group, wherein the RAID extent is mapped to the empty Mapped RAID group while shuffling the plurality of extents in the extent pool, wherein mapping the RAID extent to the empty Mapped RAID group while shuffling the plurality of extents in the extent pool includes increasing the accessible size of the empty Mapped RAID group by a size of the RAID extent while shuffling in response to mapping the RAID extent to the empty Mapped RAID group;
increasing an accessible size of a Flare LUN associated with the empty Mapped RAID group by the size of the RAID extent mapped to the empty Mapped RAID group, wherein the size of the empty Mapped RAID group is exposed to a multi-core cache through the Flare LUN;
determining that an accessible size of the empty Mapped RAID group is at least equal to a logical capacity of the empty Mapped RAID group; and reporting to an upper layer that all of the Flare LUN is accessible in response to determining that the accessible size of the empty Mapped RAID group is at least equal to the logical capacity of the empty Mapped RAID group.

8. The computing system of claim 7 wherein the operations further comprise determining whether a number of collected free drive extents is at least equal to a RAID extent width.

9. The computing system of claim 8 wherein the operations further comprise constructing a RAID extent with the number of collected free drive extents.

* * * * *